United States Patent
Hermes (10) Patent No.: US 9,976,590 B2
(45) Date of Patent: May 22, 2018

(54) FASTENING ELEMENT

(71) Applicant: Berrang Entwicklungs GmbH, Mannheim (DE)

(72) Inventor: Joachim Hermes, Viernheim (DE)

(73) Assignee: BERRANG ENTWICKLUNGS GMBH, Mannheim (DE)

( * ) Notice: Subject to any disclaimer, the term of this patent is extended or adjusted under 35 U.S.C. 154(b) by 0 days. days.

(21) Appl. No.: 15/254,491

(22) Filed: Sep. 1, 2016

(65) Prior Publication Data

US 2016/0369832 A1 Dec. 22, 2016

Related U.S. Application Data

(63) Continuation of application No. PCT/EP2015/054262, filed on Mar. 2, 2015.

(30) Foreign Application Priority Data

Mar. 3, 2014 (DE) ........................ 10 2014 203 802

(51) Int. Cl.
| | |
|---|---|
| F16B 43/00 | (2006.01) |
| F16B 41/00 | (2006.01) |
| B60B 3/14 | (2006.01) |
| F16B 5/02 | (2006.01) |
| B60B 3/16 | (2006.01) |

(52) U.S. Cl.
CPC ............ *F16B 41/002* (2013.01); *B60B 3/145* (2013.01); *B60B 3/16* (2013.01); *F16B 5/0258* (2013.01); *B60B 2310/305* (2013.01); *B60B 2900/531* (2013.01)

(58) Field of Classification Search
CPC ................................ F16B 43/00; B60B 3/145
USPC ................................................. 411/432, 533
See application file for complete search history.

(56) References Cited

U.S. PATENT DOCUMENTS

| | | | |
|---|---|---|---|
| 1,381,437 A * | 6/1921 | Smith | B23G 9/005 411/429 |
| 1,928,068 A | 9/1933 | Michelin | |
| 1,961,470 A * | 6/1934 | Winchester | B60B 3/16 301/36.1 |

(Continued)

FOREIGN PATENT DOCUMENTS

| | | |
|---|---|---|
| DE | 7 210 833 U | 6/1972 |
| DE | 25 08 057 A1 | 9/1976 |

(Continued)

OTHER PUBLICATIONS

English translation of the International Preliminary Report on Patentability, PCT/EP2015/054262, dated Jan. 27, 2016.

*Primary Examiner* — Gary W Estremsky
(74) *Attorney, Agent, or Firm* — Bose McKinney & Evans LLP (57) ABSTRACT

Disclosed is a fastening element, which can be provided in particular as a wheel nut, to be screwed onto a thread. The fastening element includes a nut with an internal thread. In addition, the fastening element includes an expansion sleeve which connects axially to the nut. The expansion sleeve is developed without an internal thread and is realized in one piece with the nut. In addition, the fastening element includes a pressure plate. The pressure plate is arranged on a side of the expansion sleeve remote from the nut and is fastened so as to be captively rotatable on the expansion sleeve.

14 Claims, 2 Drawing Sheets

(56) References Cited

U.S. PATENT DOCUMENTS

| | | | |
|---|---|---|---|
| 3,421,563 A | | 1/1969 | Koss |
| 3,508,774 A | * | 4/1970 | Simonson ............... F16B 37/00 411/265 |
| 4,362,449 A | * | 12/1982 | Hlinsky ................. B60B 3/145 411/156 |
| 4,431,353 A | * | 2/1984 | Capuano ................ B60B 3/145 411/11 |
| 4,654,913 A | | 4/1987 | Grube |
| 4,717,299 A | * | 1/1988 | Underwood ........... F16B 39/26 411/11 |
| 4,790,703 A | * | 12/1988 | Wing ................... F16B 39/284 411/260 |
| 4,969,788 A | * | 11/1990 | Goiny .................... F16B 43/00 411/428 |
| 4,971,498 A | | 11/1990 | Goforthe |
| 4,977,663 A | | 12/1990 | Hurd |
| 4,986,712 A | | 1/1991 | Fultz |
| 5,219,255 A | * | 6/1993 | Hussain ................. F16B 39/34 411/361 |
| 5,597,279 A | * | 1/1997 | Thomas ................. B60B 3/145 411/432 |
| 5,827,025 A | * | 10/1998 | Henriksen .............. F16B 39/26 411/11 |
| 5,902,084 A | * | 5/1999 | Garcia ...................... B27B 5/32 411/428 |
| 6,106,077 A | | 8/2000 | Kluge et al. |
| 8,967,932 B2 | * | 3/2015 | Dionne ................... F16B 39/26 411/313 |
| 2002/0106263 A1 | | 8/2002 | Winker |
| 2003/0068212 A1 | | 4/2003 | Wilson |
| 2005/0008457 A1 | | 1/2005 | Winker |
| 2007/0137605 A1 | | 6/2007 | Scharp |
| 2008/0022505 A1 | * | 1/2008 | Vogel ..................... B21K 1/702 29/525.02 |
| 2014/0140786 A1 | * | 5/2014 | McKinlay ............... B66C 23/62 411/147 |

FOREIGN PATENT DOCUMENTS

| | | |
|---|---|---|
| DE | 199 56 287 A1 | 5/2001 |
| DE | 603 11 732 T2 | 10/2007 |
| DE | 196 55 355 B4 | 6/2008 |
| EP | 0 004 185 A1 | 9/1979 |
| EP | 0 131 739 A1 | 1/1985 |
| EP | 0 370 212 A1 | 5/1990 |
| EP | 0 643 232 A2 | 3/1995 |
| EP | 0 836 016 A2 | 4/1998 |
| EP | 0 989 311 A1 | 3/2000 |
| EP | 1 207 313 A1 | 5/2002 |
| EP | 1 849 624 A1 | 10/2007 |
| FR | 634 341 A | 12/1928 |
| FR | 876 408 A | 11/1942 |
| GB | 1 331 460 A | 9/1973 |
| GB | 2 051 285 A | 1/1981 |
| WO | WO 03/093683 A2 | 11/2003 |
| WO | WO 2005/098246 A1 | 10/2005 |
| WO | WO 2007/068222 A1 | 6/2007 |
| WO | WO 2007/068937 A1 | 6/2007 |

* cited by examiner

FASTENING ELEMENT

RELATED APPLICATIONS

This application is a continuation of PCT/EP2015/054262, filed Mar. 2, 2015, which claims priority to DE 10 2014 203 802.2, filed Mar. 3, 2014, both of which are hereby incorporated herein by reference in their entireties.

BACKGROUND

The invention relates to a fastening element for screwing onto a thread. The fastening can be developed in particular as a wheel nut. In addition, the invention relates to a method for fastening a wheel on a vehicle, in particular on a motor vehicle or a trailer. The fastening element according to this disclosure and the method according to this disclosure can be used in particular in order to fasten one or several wheels to a wheel carrier of a vehicle. The vehicle can be in particular a motor vehicle, preferably a commercial vehicle, a construction vehicle, an agricultural vehicle or a trailer. Other areas of application are also fundamentally possible.

The prior art discloses a plurality of fastening elements, for example, in the form of bolt/nut connections. Fastening elements for wheel fastening are known in particular from the automotive engineering sector.

Thus, for example, wheel fastenings by means of bolts or studs and nuts are described in the prior art. For example, DE 25 08 057 A1 describes a wheel fastening with a stud and a nut, in particular for a bicycle wheel with a planar wheel disk reflector. The wheel fastening is developed in such a manner that the wheel stud is realized as an elastic bolt and the wheel nut comprises a shank with a centring face and a collar with a stop face.

Other developments of wheel bolts are also known from the prior art. Thus, for example, U.S. Pat. No. 1,928,068, EP 1 849 624 A1 or EP 0 836 016 A2 describe different types of wheel bolts which in each case comprise a support ring. EP 0 989 311 A1 also describes a screw-connection part, including a nut and a screw-connection produced therefrom.

In addition, numerous forms of wheel nuts or other types of connection elements are known from the prior art in the area of wheel fastenings. Reference can be made in this connection, for example, to DE 603 11 732 T2, EP 0 370 212 A1, DE 196 55 355 B4, U.S. Pat. No. 4,654,913 or FR 876408. In many cases, said wheel nuts additionally comprise a so-called rotary plate, pressure plate or pressure ring which is rotatably mounted on the wheel nut. As an example, reference can be made in this connection to EP 1 207 313 A1, EP 0 643 232 A2, U.S. Pat. No. 4,986,712, GB 2 051 285 A, U.S. Pat. No. 4,717,299, DE 199 56 287 A1, WO 2005/098246 A1, U.S. Pat. No. 4,971,498, U.S. Pat. No. 5,597,279, EP 0 004 185 A1, DE 7210833 U, WO 03/093683 A2 or EP 0 131 739 A1. Several of the named documents relate to fastening the pressure plate to the wheel nut. For example, the wheel nut can comprise a groove which is created as a result of cold forming and into which the rotary plate is inserted in a captive manner.

GB 1 331 460 A describes a pre-assembled fastening unit, in particular for use in the aircraft industry. The fastening unit comprises a nut which includes an upper region with a thread and a lower region which widens from the upper region and has a centring bore. The fastening unit further comprises a captive flanged washer.

U.S. Pat. No. 3,421,563 A describes a fastening unit which includes a male part and a nut unit. The male part comprises a cylindrical shank, a head and a threaded part. The nut unit includes a pre-assembled unit with a body which comprises a region with a threaded bore and a region which widens from said region and has a centring bore. The nut unit further includes a deformable flanged washer.

U.S. Pat. No. 3,508,774 A describes an assembly with a nut which comprises a region with a threaded bore and a region which widens from said region and has a centring bore.

However, in practice, in particular in the case of fastening large wheels, such as, for example, in the commercial vehicle sector, in the construction vehicle sector or in the agricultural vehicle sector, the fastening elements of the named type known from the prior art comprise several disadvantages. For example, numerous of the known fastening elements are not suitable for reversible assembly, as is absolutely necessary in particular in the case of wheel fastening. Thus, the safety element described in U.S. Pat. No. 3,421,563 A is linked with permanent deformation of a washer which may ensure permanent safety but stands in the way of reversible use.

In addition, in particular in the area of commercial vehicles, large bolts and nuts are used and when they are tightened strong axial forces occur. Corresponding pretensioning forces, which are usually absorbed by means of additional elements, are necessary for the connection. Thus, for example, spacer disks or spacer sleeves can be used to accommodate a necessary expansion length. However, a disadvantage of these types of structures is that the assembly necessitated by said elements is expensive and time-consuming in practice. Thus it is necessary for several elements to be stored and assembled. In addition, joints occur between the individual elements of the screw connection and these joints can become contaminated and can promote ingress of moisture and corrosion or can result in setting phenomena.

SUMMARY

This disclosure provides a fastening element and a method for fastening a wheel to a vehicle, both of which avoid the disadvantages of known fastening elements and methods of the named type at least extensively. Fastening elements, which are suitable for fastening large wheels, in particular in the area of commercial vehicles, construction vehicles and agricultural vehicles and which are simple to handle and nevertheless are developed in a sturdy manner, are disclosed in particular.

The terms "have," "comprise," "include" or "encompass" or arbitrary grammatical deviations therefrom are used below in a non-exclusive manner. Accordingly, said terms can relate both to situations in which, along with features introduced by said terms, no further features are present, or to situations in which one or several further features are present. For example, the expression "A has B," "A comprises B," "A includes B" or "A encompasses B" can relate both to the situation in which, apart from B, no further element is present in A (i.e., to a situation in which A consists exclusively of B), and to the situation in which, in addition to B, one or several further elements are present in A, for example, element C, elements C and D or even further elements.

In addition, the terms "preferably," "in particular," "for example" or similar terms are used below in conjunction with optional features without alternative embodiments being limited as a result. Thus, features which are introduced by said terms are optional features and there is no intention of restricting the scope of protection of the claims and in particular of the independent claims by said features. Thus, these teachings, as the expert will recognize, can also be carried out using other developments. In a similar manner, features which are introduced by "in an embodiment of the invention" or by "in an exemplary embodiment of the invention," can be understood as optional features without restricting alternative developments or the scope of the protection of the claims. In addition, all the possibilities to combine the features introduced in this way with other features, whether they be optional or non-optional features, are to remain unaffected by said introductory expressions.

It shall also be understood that the terms "horizontal," "vertical" and similar terms used to specify orientation are generally used herein to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "nut," "sleeve," "pressure plate," to name just a few, should be interpreted when appearing in this disclosure and claims to mean "one or more" or "at least one." All other terms used herein should be similarly interpreted unless it is made explicit that a singular interpretation is intended.

Proposed in a first aspect of this disclosure is a fastening element to be screwed onto a thread. A fastening element, in this case, is to be understood in general as an arbitrary element which is screwable on a thread, for example, a bolt or a threaded rod. In particular, the fastening element can be developed completely or in part as a nut, in particular as a wheel nut which is screwable on studs or wheel bolts of a wheel carrier of a vehicle, in particular of a motor vehicle and/or of a trailer.

The fastening element includes a nut with an internal thread. A nut, in this case, is to be understood in general as a fastening element or part of a fastening element which is screwable onto an external thread. For example, the nut can comprise a cylindrical shape, with a central bore and an internal thread. The bore can be a through-bore or also a blind bore or a pocket hole, it being possible for the latter to be developed in a closed manner, for example, on an end of the internal thread located opposite the expansion sleeve mentioned below. As is stated below in more detail, the nut can comprise in particular an outside contour on which a tool is able to be fitted, for example, an external hexagon. However, other developments are also fundamentally possible.

The fastening element additionally includes an expansion sleeve which connects axially to the nut, wherein the expansion sleeve is developed without an internal thread and is realized in one piece with the nut. An expansion sleeve, in this case, is to be understood in general within the framework of this disclosure as an element which is set up to absorb axial forces when the nut is screw-connected to a counterpart. The expansion sleeve, accordingly, can comprise elasticity. The expansion sleeve can be developed, as is stated below in more detail, in particular as a cylindrical sleeve, preferably as a circular cylindrical sleeve, preferably as a cylindrical sleeve which has a constant wall thickness at least in portions.

The expansion sleeve being realized in one piece with the nut is to be understood in general as a development where the nut and the expansion sleeve are realized as a continuous element. In particular, the expansion sleeve can consist of the same material from which the nut is produced, and/or the nut and the expansion sleeve can be produced in one and the same production step. The expansion sleeve and the nut can consequently form one common basic body which can be handled and produced as a single, one-piece component. The expansion sleeve can be connected to the nut in one piece in particular in such a manner that a rotation and/or a displacement of the expansion sleeve in relation to the nut, at least under forces occurring in normal use, is not macroscopically possible.

The fastening element additionally includes at least one pressure plate. A pressure plate, which is also called a rotary plate or pressure ring or rotary ring or support plate, is to be understood in general as an annular element which, when screw-connecting the fastening element onto the thread, can be supported by a counter bearing and, in this case, when screw-connecting to the thread, is able to build up a counter pressure. For example, a captive arrangement can be ensured in this way. The pressure plate, in a section plane parallel to an axis of the fastening element, can fundamentally comprise an arbitrary cross section, in particular a cross section which promotes a spring effect of the pressure plate. Thus, the pressure plate can comprise, for example, a conical development or a curved development in an axial section plane parallel to an axis of the fastening element, wherein, for example, a cross section of the pressure plate can widen continuously or in steps in an axial direction pointing away from the nut. Captivity of the fastening element is clearly increased as a result, contrary, for example, to the tapering or deformable washers in GB 1 331 460 A, U.S. Pat. No. 3,421,563 A or U.S. Pat. No. 3,508,774 A. The pressure plate can widen therefore in particular in a cup-shaped manner pointing away from the nut and can consequently provide, for example, as wide a support surface as possible which can also be developed in particular in a wider manner than or with a greater outside diameter than the expansion sleeve. A spring effect brought about by the pressure plate can also result in particular in longer lasting pre-tensioning than conventional washers.

The pressure plate is arranged on a side of the expansion sleeve remote from the nut and is fastened so as to be captively rotatable on the expansion sleeve. A rotatable fastening is to be understood in general as a fastening where the pressure plate is able to rotate relative to the expansion sleeve, for example, about an axis of the fastening element. Captive fastening of the pressure plate on the expansion sleeve is to be understood in general as a fastening where, at least without deforming the expansion sleeve and/or the pressure plate, the pressure plate, at least under normal forces occurring in use, cannot be separated from the expansion sleeve. In particular, the pressure plate, as stated in more detail below, can be fastened in a captive manner on the expansion sleeve by means of a flanging or crimping in the pressure plate and/or in the expansion sleeve. The flanging or crimping can be produced, for example, by means of cold forming, by means of extrusion pressing or pressing.

The fastening element, compared to known fastening elements of the named type, has several advantages. Thus, the fastening element can be developed in particular as a wheel nut, for example, as a combi-expansion wheel nut. The fastening element can be used, in particular, for screw-connection of large wheels and/or large rims, with large diameters. In the case of such large wheels or rims, on account of the large lever arm effect, as a rule eccentric loads occur in the fastening element, for example, in the bolt. This is so in the case of tractors, for example, as said vehicles have very large wheels. The huge reciprocal bending effect, which is produced by the large amount of stress, can be taken up by the expansion sleeve, which is developed in one piece with the nut, being inserted according to this disclosure between the pressure plate and the nut. The fastening element can be developed so as to be as long as possible in this way such that a correspondingly large expansion region is created as a result.

Unlike the spacer rings used up to now, which provide for artificial lengthening of the wheel bolt on account of their thickness and consequently influence an elastic resilience and an elastic bending behavior of the bolt, the fastening element proposed according to this disclosure is realized in one piece with regard to the nut and the expansion sleeve. The expansion sleeve can be realized in such a manner regarding its height that it provides a corresponding expansion length for the screw-connection in its inner region. Thus, the fastening element, which can also be called an expansion wheel nut or a combi expansion wheel nut, can, in principle, combine a wheel nut with a sleeve which can provide the expansion length for a wheel bolt. The wheel nut can otherwise be developed in particular according to corresponding standards, for example, corresponding to DIN 74361. On the opposite end, that is on the end of the expansion sleeve remote from the nut, the pressure plate is connected to the expansion sleeve so as to be rotatable such that an assembled component is created. The pressure plate is developed so as to be rotatable so that, for example, when the expansion wheel nut is screw-connected and/or screwed-in, a contact surface between the fastening element and a corresponding counter bearing is not damaged by a rotational movement.

The proposed fastening element is simple to handle as a result of the one-piece development of the expansion sleeve with the nut and as a result of the captive fastening of the pressure plate on the expansion sleeve as additional fitting of a spacer and/or a spacer sleeve is no longer necessary at assembly. In addition, the storage and manufacture of the fastening element can also be simplified in this manner. On account of the one-piece development of the expansion sleeve and of the nut as well as of the avoidance of a joint between the nut and the expansion sleeve which this makes possible, contamination and corrosion in the transition region between the nut and the expansion sleeve can also be effectively avoided. In addition, setting behavior is reduced.

The fastening element can be further developed in an advantageous manner in different ways. Thus, as stated above, the nut can comprise in particular an outside contour which enables a tool to be fitted onto the nut. In particular, the nut can comprise an outside contour with level surfaces, in particular an outside hexagon. Other developments are also fundamentally possible, for example, an outside contour with furrows and/or grooves or an outside hexalobular head for fitting a tool.

The expansion sleeve, as stated above, can be developed completely or in part in a circular cylindrical manner. In particular, the expansion sleeve can comprise, at least in portions, a circular cylindrical lateral surface. A transition region, which can comprise, for example, a shoulder, can be realized at a transition between the spacer sleeve and the nut. A smooth, transition-free development, however, is also possible.

The fastening element can be fittable in particular with the pressure plate onto a level surface, for example, onto a level surface of a counter bearing. For example, said level surface can be a rim of a wheel. The fastening element, in this case, is preferably developed in such a manner that the expansion sleeve does not touch the level surface such that the fastening element comes into contacts with the level surface exclusively by means of the pressure plate.

Further possible developments relate to the fastening of the pressure plate on the expansion sleeve. Thus, the pressure plate, as stated above, is connected to the expansion sleeve by means of in particular at least one flanging. A flanging, in this case, is to be understood in general within the framework of this disclosure as a positive locking connection where part of the expansion sleeve and/or part of the pressure plate are bent round in such a manner that the expansion sleeve and the pressure plate nest in one another and, at least without further deformation of the pressure plate and/or of the expansion sleeve, can no longer be separated from one another. At the same time, the flanging, which, for example, can include a peripheral, bent-round edge of the expansion sleeve and/or of the pressure plate, can provide for rotatability of the pressure plate on the expansion sleeve.

The expansion sleeve can comprise in particular a length along an axis of the fastening element which is at least 0.5 times a length of the internal thread of the nut along the axis, for example, at least 1.0 times. A length of the expansion sleeve can be understood, for example, as a length in the axial direction, which is measured on the side of the nut from the end of the internal thread up to an opposite end of the expansion sleeve, for example, an outermost end on the side of the expansion sleeve remote from the nut. As an alternative to this, however, on the side remote from the nut, a transition region, for example, a shoulder, can remain unconsidered when the length is measured. Once again, as an alternative to this or in addition to it, on the side remote from the nut, a flanging can remain unconsidered when the length of the expansion sleeve is measured.

For example, the length of the expansion sleeve along the axis of the fastening element is between 1.0 and 10 times, preferably between 1 and 5 times, in a particularly preferred manner between 2 times and 3 times the length of the internal thread. Said development can ensure, for example, that the expansion sleeve comprises a sufficient length, in particular in order to be able to absorb a large bolt additional force.

The expansion sleeve can comprise in particular a length along an axis of the fastening element which is at least 0.5 times, in particular at least 1.0 times, a diameter of the internal thread, preferably at least 1.5 times. An inside diameter of the internal thread can be understood, for example, as a nominal diameter of the internal thread. The expansion sleeve can in particular comprise a length along an axis of the fastening element which is between 0.5 times and 6 times a diameter of the internal thread, preferably between 1.0 times and 5 times and in a particularly preferred manner 2 times. A diameter of the internal thread, in this case, can be understood in general as a nominal diameter of the internal thread, for example, corresponding to a metric or non-metric standard.

The nut and the expansion sleeve can realize in particular a continuous bore. Said bore can be realized coaxially to an axis of the fastening element. The bore can comprise a constant diameter or also a stepwise or continuously changing diameter. In particular, the bore can comprise a greater diameter in the region of the expansion sleeve than in the region of the nut. Said latter enables, for example, the fastening element to be fitted onto the thread in a simplified manner, for example, the thread of a wheel stud. For example, the bore can comprise in the region of the expansion sleeve a diameter which is at least 1.2 times, preferably at least 1.3 times, a diameter of the bore in the region of the nut. For example, the bore can comprise in the region of the expansion sleeve a diameter which is between 1.2 times and 3 times a diameter of the bore in the region of the nut.

The fastening element can comprise a smaller outside diameter than in the region of the expansion sleeve in particular in the region of the nut. If outside contours are provided, for example, in the region of the nut, the outside diameter can be replaced, for example, by an equivalent diameter. For example, the fastening element can comprise in the region of the expansion sleeve an outside diameter which is at least 1.2 times an outside diameter of the fastening element in the region of the expansion sleeve.

The pressure plate can also comprise a larger outside diameter than or a maximum outside diameter as the expansion sleeve. Thus, the pressure plate can comprise, for example, a maximum outside diameter which is at least 1.2 times an outside diameter of the expansion sleeve.

The pressure plate can comprise along an axis of the fastening element a height which is preferably a maximum of 0.5 times a length of the expansion sleeve along the axis. As stated above, the pressure plate can comprise, in particular along the axis, a conical development and/or a development where a diameter, for example, an inside diameter and/or an outside diameter, of the pressure plate increases continuously or in steps. In this way, the pressure plate is able to develop, for example, a spring effect in the axial direction. Other developments with a spring effect are also fundamentally conceivable.

As is stated above, the fastening element is preferably developed for large bolts. Thus, the internal thread can correspond, for example, to at least an M8 thread and preferably to at least an M10 thread and in a particularly preferred manner to at least an M12 thread, for example, an M22 thread or an M24 thread. Non-metric threads are also fundamentally possible, preferably with an internal diameter of at least 8 mm, preferably at least 10 mm or at least 12 mm.

The fastening element can be produced in particular completely or in part from steel. Thus, for example, grade 10 steel to DIN 74361-3 can be used. The pressure plate can be produced from the same material from which the nut and/or the expansion sleeve are also produced, or even from a different material. Thus, for example, a material of higher elasticity can be used for the pressure plate than for the nut and/or for the expansion sleeve. The use of the same material, however, is also fundamentally possible. The fastening element can additionally be provided completely or in part with one or several coatings. Thus, for example, the fastening element, in particular the nut and/or the expansion sleeve, as an alternative or in addition, however, also the pressure plate, can be coated completely or in part with a covering which provides corrosion protection, for example, a zinc flake coating. Other corrosion protection systems are also fundamentally possible.

In a further aspect of this disclosure, a method for fastening a wheel on a vehicle is proposed. In this case, a plurality of fastening elements according to this disclosure, for example, according to one or several of the above-described developments and/or according to one or several of the embodiments described in more detail below, are used, for example, at least three fastening elements, preferably at least five fastening elements. The method includes the method steps named below which can preferably be carried out in the named order, a different sequence being possible, however, in principle, and/or it being possible to carry out the method steps completely or partially at the same time. It is also conceivable to carry out the method steps repeatedly, parallel in time or overlapping in time.

The method includes the following steps:
a) place the wheel onto a wheel carrier of the vehicle, wherein studs or wheel bolts of the vehicle are pushed through holes in the wheel rim;
b) place the fastening elements onto the studs or wheel bolts;
c) screw-connect the fastening elements to the studs or wheel bolts, wherein a tool is fitted on the outside contours of the nuts and wherein the pressure plates of the fastening elements come to rest on the rim of the wheel during the screw-connection.

The vehicle can be, for example, a motor vehicle or also a vehicle without its own drive, for example, a trailer. A wheel carrier of the vehicle, in this case, is to be understood in general as an element of the vehicle which receives the wheel. In this connection, this can be, for example, a surface of an axis of the wheel, on which the wheel is placed directly or with the interposition of one or several intermediate elements. Studs are to be understood in general within the framework of this disclosure as threaded rods or bolts of the vehicle which are fixedly connected to the vehicle and which are set up for receiving a wheel on the wheel carrier and for fixing the wheel on the wheel carrier. Wheel bolts are correspondingly to be understood within the framework of this disclosure as threaded rods or bolts which are not fixedly connected to the vehicle and which are set up for receiving a wheel on the wheel carrier and for fixing the wheel on the wheel carrier. Rim holes are to be understood in general as openings in a rim of the wheel, through which the studs are able to be pushed. The tool can include, for example, at least one wrench, for example, one wheel nut or wheel bolt wrench, for example, a hexagon wrench. In addition, torque wrenches or other tools, for example, can also be used for screw-connection.

In summary, within the framework of this disclosure the following embodiments are particularly preferred:

Embodiment 1 fastening element, in particular wheel nut, for screw-connection onto a thread, said fastening element including a nut with an internal thread, additionally including an expansion sleeve which connects axially to the nut, wherein the expansion sleeve is developed without any internal thread and is realized in one piece with the nut, additionally including a pressure plate, wherein the pressure plate is arranged on a side of the expansion sleeve remote from the nut and wherein the pressure plate is fastened in a captively rotatable manner on the expansion sleeve.

Embodiment 2 fastening element according to the preceding embodiment, wherein the pressure plate comprises a conical development or a curved development in an axial section plane parallel to an axis of the fastening element, wherein a cross section of the pressure plate widens continuously or in steps in an axial direction pointing away from the nut.

Embodiment 3 fastening element according to one of the preceding embodiments, wherein the nut comprises an outside contour, in particular an outside contour for fitting a tool thereon, in particular an outside contour with level surfaces and preferably an outside hexagon.

Embodiment 4 fastening element according to one of the preceding embodiments, wherein the expansion sleeve comprises a circular cylindrical lateral surface.

Embodiment 5 fastening element according to one of the preceding embodiments, wherein the fastening element is fittable with the pressure plate onto a level surface, wherein the expansion sleeve does not touch the level surface.

Embodiment 6 fastening element according to one of the preceding embodiments, wherein the pressure plate is connected to the expansion sleeve by means of a flanging.

Embodiment 7 fastening element according to one of the preceding embodiments, wherein the expansion sleeve comprises a length along an axis of the fastening element which is at least 0.5 times, in particular at least 1.0 times, a diameter of the internal thread.

Embodiment 8 fastening element according to one of the preceding embodiments, wherein the expansion sleeve comprises a length along an axis of the fastening element which is between 0.5 times and 6 times, in particular between 1.0 times and 6 times a diameter of the internal thread.

Embodiment 9 fastening element according to one of the preceding embodiments, wherein the expansion sleeve comprises a length along an axis of the fastening element which is at least 0.5 times, and preferably at least 1.0 times, a length of the internal thread the nut along the axis.

Embodiment 10 fastening element according to the preceding embodiment, wherein the length of the expansion sleeve along the axis of the fastening element is between 1.0 times and 10 times, preferably between 1 time and 5 times, in a particularly preferred manner between 2 times and 3 times the length of the internal thread.

Embodiment 11 fastening element according to one of the preceding embodiments, wherein the nut and the expansion sleeve realize a continuous bore.

Embodiment 12 fastening element according to the preceding embodiment, wherein the bore comprises a greater diameter in the region of the expansion sleeve than in the region of the nut.

Embodiment 13 fastening element according to the preceding embodiment, wherein the bore comprises in the region of the expansion sleeve a diameter which is at least 1.2 times and preferably at least 1.3 times a diameter of the bore in the region of the nut.

Embodiment 14 fastening element according to one of the preceding embodiments, wherein the fastening element comprises a smaller outside diameter in the region of the nut than in the region of the expansion sleeve.

Embodiment 15 fastening element according to one of the preceding embodiments, wherein the pressure plate comprises a greater outside diameter than the expansion sleeve.

Embodiment 16 fastening element according to one of the preceding embodiments, wherein the pressure plate comprises an outside diameter which is at least 1.2 times an outside diameter of the expansion sleeve.

Embodiment 17 fastening element according to one of the preceding embodiments, wherein the pressure plate comprises a height along an axis of the fastening element, wherein the height is a maximum of 0.5 times a length of the expansion sleeve along the axis.

Embodiment 18 fastening element according to one of the preceding embodiments, wherein the internal thread corresponds to at least an M8 thread and preferably to at least an M12 thread.

Embodiment 19 fastening element according to one of the preceding embodiments, wherein the fastening element is produced completely or in part from steel, in particular a grade 10 steel to DIN 74361-3.

Embodiment 20 method for fastening a wheel on a vehicle, wherein a plurality of fastening elements according to one of the preceding embodiments is used, said method including the following steps:

a) place the wheel onto a wheel carrier of the vehicle, wherein studs or wheel bolts of the vehicle are pushed through holes in the wheel rim;
b) place the fastening elements onto the studs or wheel bolts;
c) screw-connect the fastening elements to the studs or wheel bolts, wherein a tool is fitted on the outside contours of the nuts and wherein the pressure plates of the fastening elements come to rest on the rim of the wheel during the screw-connection.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
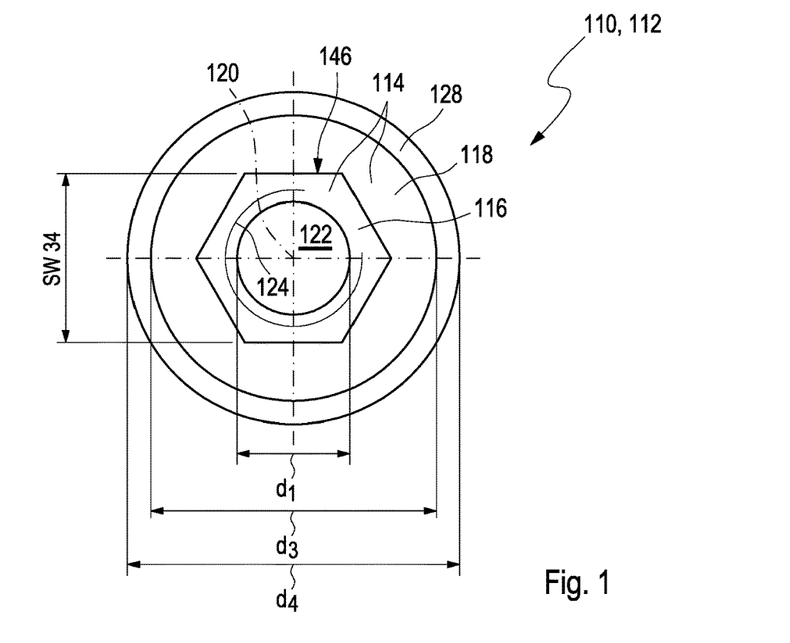
FIG. 1 shows a top view of an exemplary embodiment of a fastening element according to this disclosure.
Figure 2:
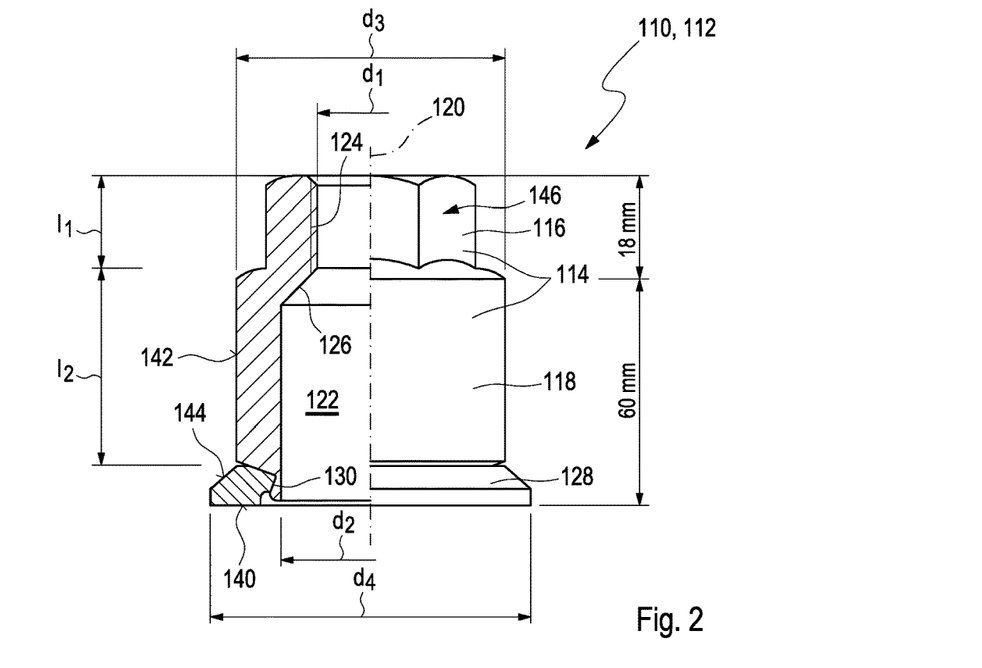
FIG. 2 shows a part-sectioned representation of the fastening element according to FIG. 1 from the side.

FIGS. 1 and 2 show an exemplary embodiment of a fastening element 110 in the form of a wheel nut 112. In this case, FIG. 1 shows a top view of the fastening element 110, whereas FIG. 2 shows a partially sectioned representation of the fastening element 110 in a section plane perpendicular to the drawing plane in FIG. 1. FIG. 2, as an example, specifies lengths which are, however, not to restrict the invention and which can also be replaced by other measurements.

The fastening element 110 includes a basic body 114 which is divided into a nut 116 and an expansion sleeve 118. The nut 116 and the expansion sleeve 118 are arranged coaxially with respect to an axis 120 and directly adjoin one another along the axis 120. The basic body 114 with the nut 116 and the expansion sleeve 118 are realized in one piece and can be produced, in particular, from a steel, for example, a grade 10 steel to DIN 74361-3. In addition, the basic body 114, as stated above, can be provided with a coating, for example, as corrosion protection.

As can be seen, for example, from FIG. 2, the basic body 114 preferably comprises a continuous bore 122. In the region of the nut 116, said bore 122 comprises an inside diameter $d_1$, and in the region of the expansion sleeve 118 an inside diameter $d_2$. The inside diameter $d_1$ of the nut 114 can correspond, for example, to a nominal diameter of an internal thread 124 of the nut 116, for example, a metric or non-metric internal thread, for example, with a nominal diameter ≥M8. For example, wheel nuts ≥M10, ≥M12, ≥M20 or even ≥M22 are able to be produced. The inside diameter $d_2$ of the threadless expansion sleeve 118 can be developed so as to be greater, for example, than the inside diameter $d_1$, for example, by at least 1.3 times the diameter $d_1$. In a transition region 126 between the expansion sleeve 118 and the nut 116, which can still be attributed to the expansion sleeve 118, the bore 122 can comprise, for example, a conical development, whereas the bore 122 is otherwise preferably developed in a cylindrical manner.

A pressure plate 128 is arranged on the end of the expansion sleeve 118 pointing away from the nut 116. The pressure plate 128 is connected to the expansion sleeve 118 so as to be rotatable and captive, for example, by means of a flanging 130 or a crimp connection. The pressure plate 128 can comprise, for example, a support surface 140, by means of which the pressure plate 128 is able to be fitted onto a bearing surface, for example, a surface of a rim. When it is thus fitted, the expansion sleeve 118 preferably does not contact the rim such that the support surface 140 provides the furthest downwardly protruding surface in the axial direction in FIG. 2.

The expansion sleeve 118 can comprise, for example, an outside diameter $d_3$ which, as an example, can be about 46 mm. Other measurements are, however, also possible. The pressure plate 128 can comprise an outside diameter $d_4$ which is preferably greater than the outside diameter $d_3$ and which, as an example, can be about 53 mm. Other measurements are, however, also possible.

The nut 116 comprises in the axial direction, for example, a length $l_1$ which can be determined in particular by the length of the internal thread 124. The expansion sleeve 118 can comprise a length $l_2$ in the axial direction. As shown in FIG. 2, said length can be calculated upward from the end of the internal thread 124. The length of the expansion sleeve 118 downward can be defined, for example, up to the start of the flanging 130 such that the flanging 130 itself no longer contributes to the length of the expansion sleeve 118. As an alternative to this, the flanging 130 could, however, still be calculated in the length $l_2$. For example, the length $l_1$ can be between 5 and 25 mm, for example, 18 mm, whereas the length $l_2$, as an example, can be between 20 and 80 mm, for example, 60 mm. Other dimensions are, however, also possible.

In order to provide a sufficient expansion length, it is particularly preferred when the length $l_2$ of the expansion sleeve 118 is at least 0.5 times the diameter $d_1$ of the internal thread 124 of the nut 116, preferably at least 1.0 times and in a particularly preferred manner at least 1.5 times. Thus, the length $l_2$ can be, for example, between 0.5 times and 5 times the diameter $d_1$, preferably between 1.0 times and 6 times and in a particularly preferred manner 2 times. As an alternative to this or in addition to it, the length $l_2$ of the expansion sleeve 118 can be at least 0.5 times, in particular at least 1.0 times, the length $l_1$ of the internal thread 124 of the nut 116 and/or can be, for example, between 1.0 times and 10 times, preferably between 1 times and 5 times and in a particularly preferred manner between 2 times and 3 times the length $l_1$. Other dimensions are, however, also possible.

The expansion sleeve 118, as can be seen in FIG. 2, preferably comprises a predominantly cylindrical development, with a circular cylindrical lateral surface 142. Other contours are, however, also fundamentally possible. The pressure plate 128, in contrast, preferably comprises a conical development, for example, with a conical lateral surface 144. Other developments are, however, also possible.

In the region of the nut 116, the fastening element 110 preferably comprises an outside contour 146 which enables a tool to be fitted thereon. As an example, this can be a hexagon, for example, a hexagon according to a metric or non-metric standard. An SW 34 hexagon is specified in FIG. 1 as an example.

When using the wheel nut 112, a wheel can be fitted onto a wheel carrier of a vehicle, studs or wheel bolts of the vehicle being pushed through holes in the rim of the wheel. The wheel nut 112 can then be fitted according to FIGS. 1 and 2 onto the thread of the studs or wheel bolts and screw-connected with the studs or wheel bolts. In particular in the area of commercial vehicles, agricultural vehicles and construction vehicles, whether it be motor vehicles or also trailers, enormous loads occur in this case on account of the dimensions that are normal here. Said pre-tensioning force in the axial direction is able to be absorbed by the expansion sleeve 118. As in the exemplary embodiment shown there is no joint whatsoever between the nut 116 and the expansion sleeve 118, the fastening element 110 shown is additionally very unsusceptible to contamination and corrosion. In addition, the fastening operation is comparatively simple compared to normal fastening operations with a multiple-part development, for example, using a separate expansion sleeve.

Figure 3:
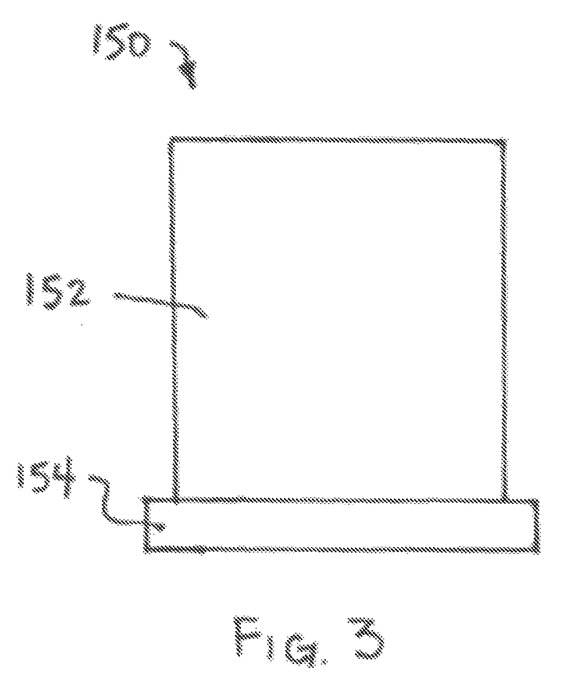
FIG. 3 shows a schematic view of a fastening element wherein a cross section of the pressure plate widens in steps in an axial direction pointing away from the nut.

An alternative embodiment is shown in a highly schematic view in FIG. 3. In FIG. 3, a fastening element 150 is shown and includes a basic body 152 including both the nut and expansion sleeve similar to the embodiment of FIGS. 1 and 2. The embodiment of FIG. 3 also includes a pressure plate 154 wherein a cross section of the pressure plate widens in steps in an axial direction pointing away from the nut. As noted above, FIG. 3 is a highly schematic representation and does not represent actual shapes, relative proportions and/or dimensions of the basic body and pressure plate.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCES

110 Fastening element
112 Wheel nut
114 Basic body
116 Nut
118 Expansion sleeve
120 Axis
122 Bore
124 Internal thread
126 Transition region
128 Pressure plate
130 Flanging
140 Support surface
142 Lateral surface
144 Conical lateral surface
146 Outside contour

What is claimed is:

1. A fastening element adapted to be screwed onto a thread, the fastening element comprising:
   a nut with an internal thread;
   a threadless expansion sleeve axially connected to and formed in one piece with the nut;
   a pressure plate arranged on a side of the expansion sleeve remote from the nut, wherein the pressure plate is captively rotatable on the expansion sleeve and has a conical or curved development in an axial section plane parallel to an axis of the fastening element, wherein a cross section of the pressure plate widens continuously or in steps in an axial direction pointing away from the nut and wherein the pressure plate defines an inwardly facing, annular concave surface to thereby form a cup-shaped structure which generates a spring effect; and
   wherein the expansion sleeve comprises an unthreaded length that is located between an end of the pressure plate nearest the internal thread and an end of the internal thread nearest the pressure plate.

2. The fastening element as claimed in claim 1, wherein the expansion sleeve comprises a circular cylindrical lateral surface.

3. The fastening element as claimed in claim 1, wherein the pressure plate is connected to the expansion sleeve by a flanging.

4. The fastening element as claimed in claim 1, wherein the expansion sleeve comprises a length along an axis of the fastening element which is between 0.5 times and 6 times a diameter of the internal thread.

5. The fastening element as claimed in claim 1, wherein the nut and the expansion sleeve form a continuous bore, wherein the bore comprises a greater diameter in a region of the expansion sleeve than in a region of the nut.

6. The fastening element as claimed in claim 1, wherein the pressure plate comprises a greater outside diameter than the expansion sleeve.

7. The fastening element as claimed in claim 1, wherein the internal thread is adapted to be screwed onto a thread at least as large as an M8 thread.

8. The fastening element as claimed in claim 7, wherein the internal thread is adapted to be screwed onto a thread at least as large as an M12 thread.

9. The fastening element as claimed in claim 1, wherein the fastening element is a wheel nut.

10. The fastening element as claimed in claim 1, wherein the pressure plate defines a first annular contact surface facing the expansion sleeve and the expansion sleeve defines a second annular contact surface facing the pressure plate and wherein the first and second contact surfaces are in full flush contact in an unloaded condition and allow rotational movement between the pressure plate and expansion sleeve.

11. A fastening element adapted to be screwed onto a thread, the fastening element comprising:
    a nut with an internal thread;
    a threadless expansion sleeve axially connected to and formed in one piece with the nut;
    a pressure plate arranged on a side of the expansion sleeve remote from the nut, wherein the pressure plate is captively rotatable on the expansion sleeve and has a conical or curved development in an axial section plane parallel to an axis of the fastening element, wherein a cross section of the pressure plate widens continuously or in steps in an axial direction pointing away from the nut and wherein the pressure plate defines an inwardly facing, annular concave surface to thereby form a cup-shaped structure which generates a spring effect; and
    wherein the expansion sleeve comprises a length along an axis of the fastening element which is at least 0.5 times a diameter of the internal thread.

12. A fastening element adapted to be screwed onto a thread, the fastening element comprising:
    a nut with an internal thread;
    a threadless expansion sleeve axially connected to and formed in one piece with the nut;

a pressure plate arranged on a side of the expansion sleeve remote from the nut, wherein the pressure plate is captively rotatable on the expansion sleeve and has a conical or curved development in an axial section plane parallel to an axis of the fastening element, wherein a cross section of the pressure plate widens continuously or in steps in an axial direction pointing away from the nut and wherein the pressure plate defines an inwardly facing, annular concave surface to thereby form a cup-shaped structure which generates a spring effect; and wherein the expansion sleeve comprises a length along an axis of the fastening element which is at least 0.5 times a length of the internal thread of the nut along the axis.

13. The fastening element as claimed in claim 12, wherein the length of the expansion sleeve along the axis of the fastening element is between 1.0 times and 10 times the length of the internal thread along the axis of the fastening element.

14. A method for fastening a wheel on a vehicle using a plurality of fastening elements according to claim 1, said method including the following steps:
   a) placing the wheel onto a wheel carrier of the vehicle, wherein studs or wheel bolts of the vehicle are pushed through holes in the wheel rim;
   b) placing the fastening elements onto the studs or wheel bolts; and
   c) screw-connecting the fastening elements to the studs or wheel bolts, wherein a tool is fitted on the outside contours of the nuts and wherein the pressure plates of the fastening elements come to rest on a rim of the wheel during the screw-connection.

* * * * *